(12) United States Patent
Tanaka et al.

(10) Patent No.: US 9,908,447 B2
(45) Date of Patent: Mar. 6, 2018

(54) SEAT AIR CONDITIONING DEVICE FOR VEHICLE

(71) Applicant: DENSO CORPORATION, Kariya, Aichi-pref. (JP)

(72) Inventors: Yuusuke Tanaka, Kariya (JP); Yasuhiko Niimi, Kariya (JP); Takahisa Fujii, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/307,020

(22) PCT Filed: May 27, 2015

(86) PCT No.: PCT/JP2015/002670
§ 371 (c)(1),
(2) Date: Oct. 27, 2016

(87) PCT Pub. No.: WO2016/002128
PCT Pub. Date: Jan. 7, 2016

(65) Prior Publication Data
US 2017/0043694 A1 Feb. 16, 2017

(30) Foreign Application Priority Data
Jun. 30, 2014 (JP) .................... 2014-133918

(51) Int. Cl.
*A47C 7/74* (2006.01)
*B60N 2/56* (2006.01)
(Continued)

(52) U.S. Cl.
CPC ........... *B60N 2/5657* (2013.01); *B60H 1/00* (2013.01); *B60H 1/00285* (2013.01);
(Continued)

(58) Field of Classification Search
CPC .................. B60N 2/5657; B60H 1/00
(Continued)

(56) References Cited

U.S. PATENT DOCUMENTS

| 6,105,667 A | 8/2000 | Yoshinori et al. |
| 6,478,369 B1* | 11/2002 | Aoki .................. B60H 1/00271 297/180.1 |
| 2005/0093346 A1* | 5/2005 | Witchie .............. B60N 2/5628 297/180.1 |

FOREIGN PATENT DOCUMENTS

| JP | H11268517 A | 10/1999 |
| JP | 2001018626 A | 1/2001 |

(Continued)

OTHER PUBLICATIONS

English translation of the Abdtract, documents JP2007196961A and JP 2008296771A.*

*Primary Examiner* — Helena Kosanovic
(74) *Attorney, Agent, or Firm* — Harness, Dickey & Pierce, P.L.C.

(57) ABSTRACT

A seat air conditioning device that blows out air from a seat, supplied from an interior air conditioning unit that air-conditions a space in a passenger compartment for a vehicle, includes: a floor-side duct and a seat-side duct. The floor-side duct is disposed adjacent to a floor of a vehicle body member forming the space in the passenger compartment and is connected to the interior air conditioning unit. The air supplied from the interior air conditioning unit flows through the floor-side duct. The seat-side duct is disposed adjacent to the seat and communicates with the floor-side duct through a connecting duct. The connecting duct is configured to be deformed to follow displacement of the seat, and is arranged along a vehicle harness that connects a (Continued)

floor-side wiring member disposed adjacent to the floor and a seat-side wiring member disposed adjacent to the seat.

14 Claims, 7 Drawing Sheets

(51) Int. Cl.
    *B60H 1/00* (2006.01)
    *B60N 2/06* (2006.01)

(52) U.S. Cl.
    CPC ..... *B60H 1/00557* (2013.01); *B60H 1/00564* (2013.01); *B60N 2/06* (2013.01); *B60N 2/5628* (2013.01); *B60N 2/5642* (2013.01)

(58) Field of Classification Search
    USPC .......................................................... 454/120
    See application file for complete search history.

(56) References Cited

FOREIGN PATENT DOCUMENTS

| | | | |
|---|---|---|---|
| JP | 2001047848 A | | 2/2001 |
| JP | 2007196961 A | * | 8/2007 |
| JP | 2007283833 A | | 11/2007 |
| JP | 2008296771 A | * | 12/2008 |
| JP | 2010030535 A | | 2/2010 |
| JP | 2012131356 A | | 7/2012 |

* cited by examiner

000000# SEAT AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2015/002670 filed on May 27, 2015 and published in Japanese as WO 2016/002128 A1 on Jan. 7, 2016. This application is based on and claims the benefit of priority from Japanese Patent Application No. 2014-133918 filed on Jun. 30, 2014. The entire disclosures of all of the above applications are incorporated herein by reference.

TECHNICAL FIELD

The present disclosure relates to a seat air conditioning device, which blows off air from a seat, for a vehicle

BACKGROUND ART

Conventionally, this type of vehicle seat air conditioning device is described in Patent Literatures 1 and 2. In each of these pieces of conventional art, blown air flows through an air passage provided in a seat and is blown out toward an occupant from blow outlets provided to a surface of the seat. The vehicle seat air conditioning device described in each of the pieces of conventional art includes a floor-side duct having a suction port coupled to an air conditioning unit for the vehicle and disposed on a side of a floor of a vehicle body and a seat-side duct disposed on a side of a seat cushion.

Specifically, in the conventional art described in Patent Literature 1, the seat-side duct is formed so that a suction port into which a blow outlet of the floor-side duct is inserted and a blow outlet of the vehicle floor opened to the seat cushion communicate with each other through the air passage. An opening of the suction port of the seat-side duct is elongated along a front-rear direction of the seat cushion. The floor-side duct is longer and wider than the suction port of the seat-side duct.

However, because the floor-side duct and the seat-side duct are not in contact with each other in the conventional art described in Patent Literature 1, a leakage of conditioned air from a clearance between the floor-side duct and the seat-side duct and mixture between outside air and inside air due to inflow of air from the clearance into the duct occur, which may reduce air conditioning performance.

The vehicle seat air conditioning device needs to have capability of following sliding of a vehicle seat in the front-rear direction. In the conventional art described in Patent Literature 1, the conditioning device adapts to the sliding of the vehicle seat in the front-rear direction by securing a front-rear length of the suction port of the seat-side duct. Therefore, the seat-side duct increases in size, which may reduce ease of mounting.

On the other hand, in the conventional art described in Patent Literature 2, the seat-side duct is formed by a flexible duct (bellows duct) that expands and contracts to adapt to the sliding of the seat in the front-rear direction.

PRIOR ART LITERATURES

Patent Literature

Patent Literature 1: JP 2012-131356 A
Patent Literature 2: JP 2001-47848 A

SUMMARY OF INVENTION

In recent years, there are an increasing number of vehicles in each of which a vehicle harness (wiring member) is provided below a vehicle seat. When the conventional art described in Patent Literature 2 is applied to such a vehicle, interference and entanglement of the seat-side duct and the harness with each other may occur, thereby reducing ease of mounting.

With the above points in view, an object of the present disclosure is to provide a seat air conditioning device for a vehicle, ease of mounting of which can be improved while air conditioning performance is secured.

According to an aspect of the present disclosure, a seat air conditioning device that blows air out of a seat, which is supplied from an interior air conditioning unit that air-conditions a space in a passenger compartment for a vehicle includes: a floor-side duct that is disposed adjacent to a floor of a vehicle body member forming the space in the passenger compartment and is connected to the interior air conditioning unit such that the air supplied from the interior air conditioning unit flows through the floor-side duct; and a seat-side duct disposed adjacent to the seat and communicates with the floor-side duct through a connecting duct. The connecting duct is configured to be deformed to follow displacement of the seat. The connecting duct is arranged along a connecting wiring member that connects a floor-side wiring member disposed adjacent to the floor and a seat-side wiring member disposed adjacent to the seat.

According to the aspect, since the connecting duct is able to be deformed to follow displacement of the seat, the connecting duct can be deformed to follow the displacement, even when a position of the seat is adjusted. At this time, because the floor-side duct and the seat-side duct communicate with each other through the connecting duct, it is possible to prevent a leakage of conditioned air from the ducts and inflow of outside air from the ducts. Therefore, it is possible to secure the air conditioning performance.

Since the connecting duct is provided along the connecting wiring member, it is possible to suppress interference and entanglement of the connecting duct and the connecting wiring member with each other when the position of the seat is adjusted. Therefore, it is possible to improve the ease of mounting.

DESCRIPTION OF EMBODIMENTS

Figure 1:
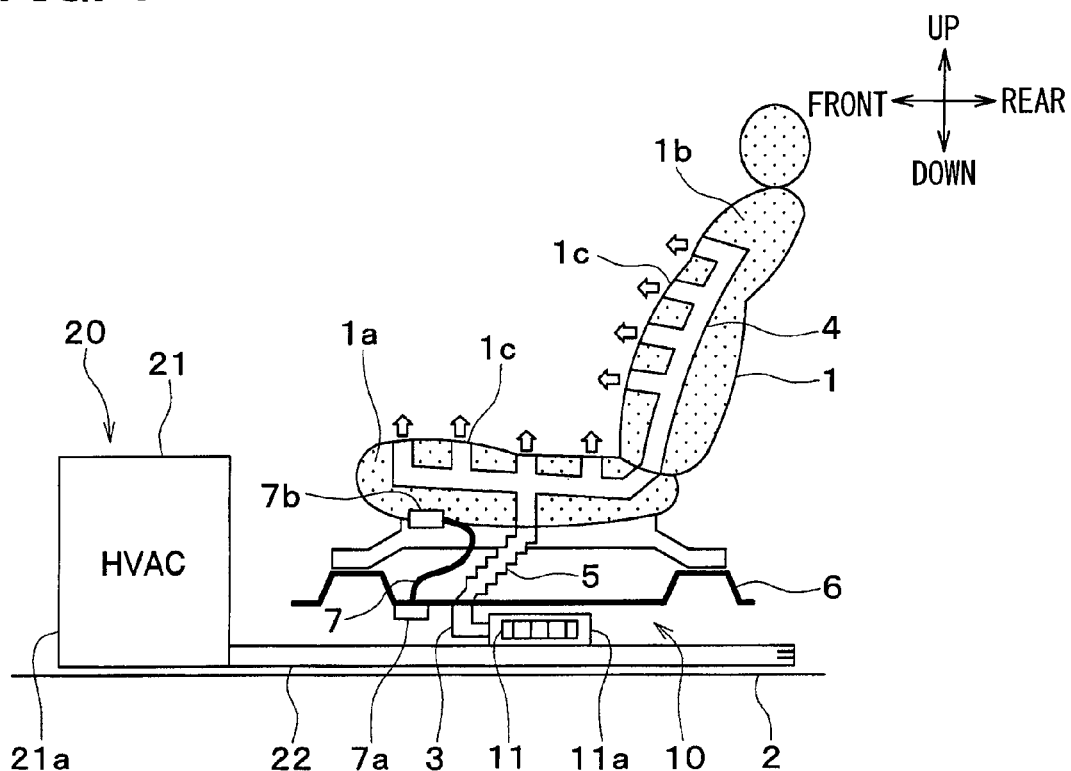
FIG. 1 is a schematic diagram showing a general structure of a seat air conditioning device for a vehicle according to a first embodiment.

Hereinafter, embodiments will be described according to the drawings. Same or equivalent portions among respective embodiments below are labeled with same reference numerals in the drawings.

First Embodiment

Figure 2:
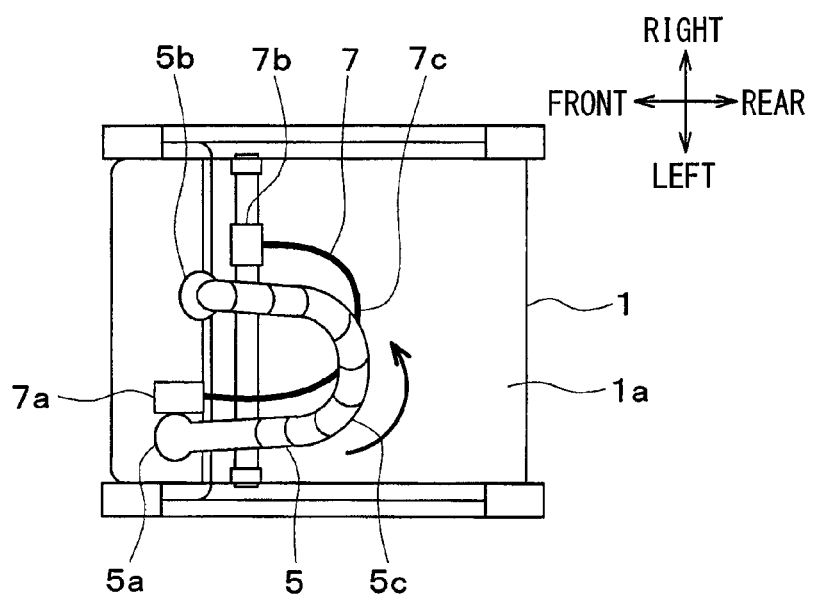
FIG. 2 is a schematic plan view of a seat face of a seat according to the first embodiment seen from below the vehicle.
Figure 3:
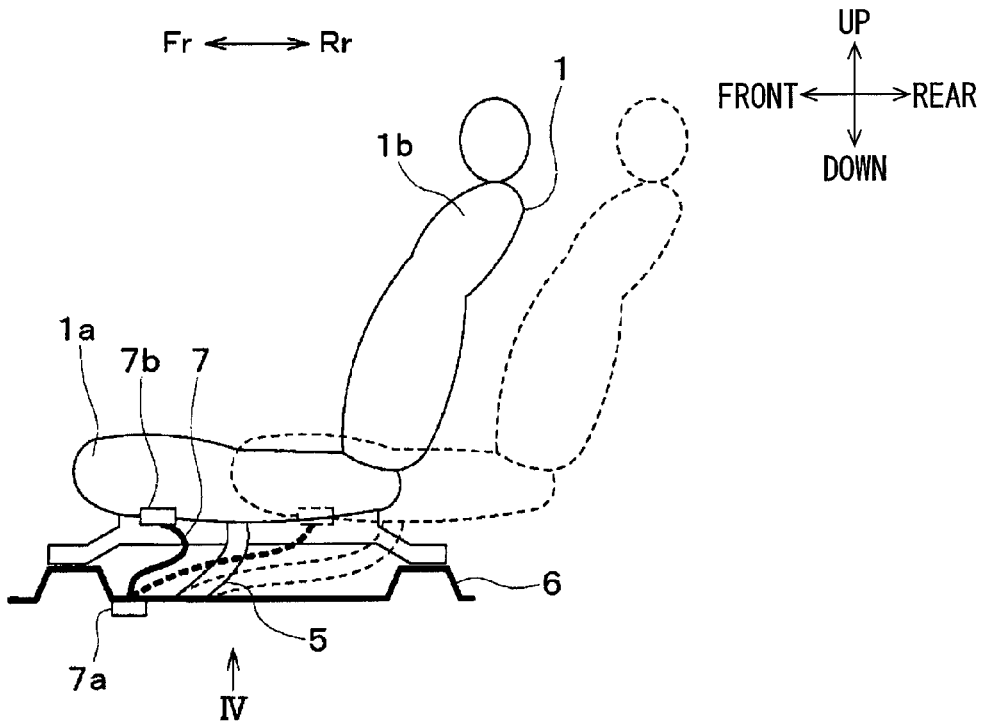
FIG. 3 is a view for explaining a state of the seat air conditioning device according to the first embodiment when a position of the seat in a front-rear direction is adjusted.
Figure 4:
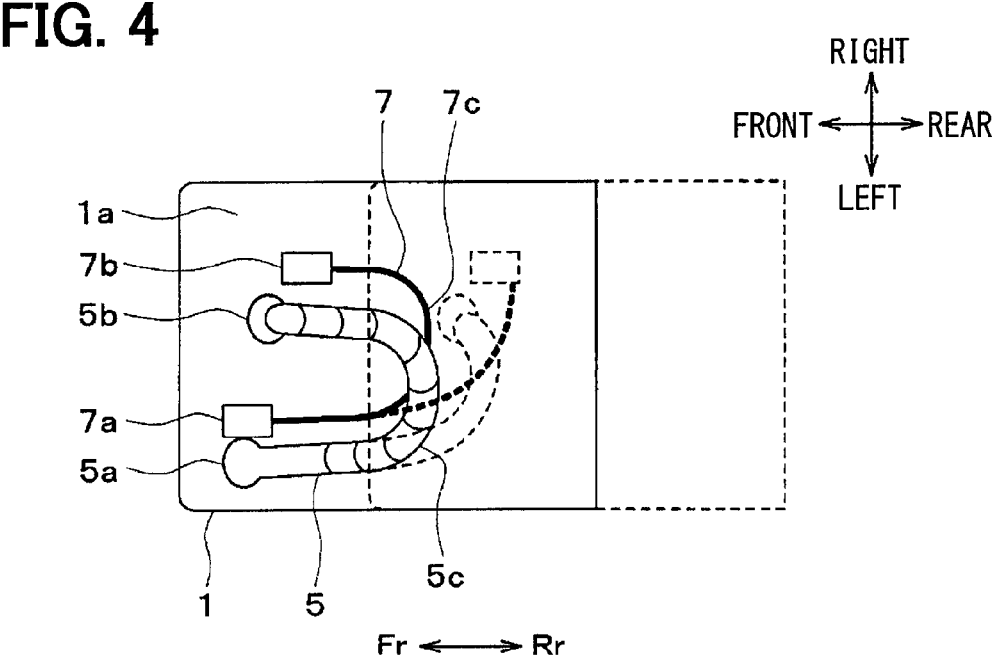
FIG. 4 is a diagram taken in a direction of arrow IV in FIG. 3.

The first embodiment will be described with reference to FIGS. 1 to 4. In the present embodiment, a seat air conditioning device is applied to a front seat (such as a driver's seat or a passenger seat) for a vehicle. Up, down, front, and rear arrows in FIGS. 1 and 3 show upward, downward, forward, and rearward directions with respect to the vehicle. Front, rear, left, and right arrows in FIGS. 2 and 4 show forward, rearward, leftward, and rightward directions with respect to the vehicle.

The seat air conditioning device 10 is configured to blow out cold air, supplied from an interior air conditioning unit 21 of an air conditioner 20 for the vehicle that air-conditions a space in a vehicle compartment, from a surface of a front seat 1 (hereinafter simply referred to as seat 1).

The seat air conditioning device 10 includes a floor-side duct 3 disposed near a floor (vehicle floor face) 2 of a vehicle body member forming the space in the vehicle compartment and a seat-side duct 4 connected to the seat 1. The seat-side duct 4 communicates with the floor-side duct 3 through a connecting duct 5.

The floor-side duct 3 is connected to the interior air conditioning unit 21 and air supplied from the interior air conditioning unit 21 flows through the floor-side duct 3. The floor-side duct 3 is disposed below a carpet 6. An inlet of the connecting duct 5 is connected to an outlet of the floor-side duct 3. A blowing port of a blower 11 of the seat air conditioning device 10 is connected to an inlet of the floor-side duct 3.

The blower 11 includes a blower fan that generates blown air, a motor that drives the blower fan for rotation, and a casing 11a that houses the blower fan. A seat air conditioning duct 22 (described later) is connected to an air suction port of the casing 11a (a suction side of the blower 11).

The seat-side duct 4 defines an air passage formed in insides (cushion material) of a seat face 1a and a backrest 1b of the seat 1. An outlet of the connecting duct 5 is connected to an inlet of the seat-side duct 4. A plurality of air blowing holes 1c formed in surfaces (surface skins) of the seat face 1a and the backrest 1b of the seat 1 are connected to an outlet of the seat-side duct 4.

The connecting duct 5 hangs down from a back face (lower face) of the seat 1 toward the floor 2. The connecting duct 5 draws in the cold air supplied from the air conditioner 20 for the vehicle from a lower end portion and causes the cold air to flow into the seat-side duct 4. A specific structure of the connecting duct 5 will be described later.

The blown air from the blower 11 flows through the floor-side duct 3, the connecting duct 5, and the seat-side duct 4 in this order and is blown out of the surfaces of the seat face 1a and the backrest 1b of the seat 1 through the air blowing holes 1c.

The interior air conditioning unit 21 is disposed inside an instrument panel (not shown) at a most front portion in the vehicle compartment. The interior air conditioning unit 21 includes various air conditioning devices such as the blower, an evaporator (cooling heat exchanger) and a heater core (heating heat exchanger) of a refrigeration cycle, and the like in an air conditioning case 21a. The conditioned air adjusted to a desired temperature by the interior air conditioning unit 21 is blown into the vehicle compartment from ducts and blow outlets (both of which are not shown) connected to the air conditioning case 21a.

As the ducts, the face duct, the foot duct, and the defroster duct are provided. As the blow outlets, the face blow outlet, the foot blow outlet, and the defroster blow outlet are provided.

The face blow outlet is disposed at an upper portion of the instrument panel and blows out cold air mainly toward a head of an occupant to give coolness to the occupant. The foot blow outlet is disposed at a lower portion of the instrument panel and blows out warm air mainly toward feet of the occupant to give warmth to the occupant. The defroster blow outlet is disposed on an upper face of the instrument panel and blows out conditioned air toward a windshield of the vehicle to prevent fogging of the windshield.

The seat air conditioning duct 22 of the seat air conditioning device 10 is connected to a downstream side of the air conditioning case 21a. The seat air conditioning duct 22 performs a function of supplying the cold air cooled by the interior air conditioning unit 21 to the floor-side duct 3.

The seat air conditioning duct 22 extends along the floor 2 from the air conditioning case 21a toward a rear side of the vehicle compartment. More specifically, the seat air conditioning duct 22 is disposed between the floor 2 and the carpet 6.

The seat 1 is a power seat and a motor (not shown) is embedded in the seat 1 so as to be able to electrically adjust a position of the seat 1 in a front-rear direction. Therefore, a vehicle harness 7 for supplying electric power from a vehicle main body to the seat 1 is connected to the seat 1. The vehicle harness 7 is a connecting wiring member that connects a floor-side wiring member (not shown) disposed on the side of the floor 2 and a seat-side wiring member (not shown) disposed on a side of the seat 1.

As shown in FIG. 2, the connecting duct 5 is formed by a flexible member (flexible duct) so as to be deformed to follow displacement of the seat 1. In the present embodiment, the connecting duct 5 is formed by a bellows duct. The connecting duct 5 is provided along the vehicle harness 7. In the present embodiment, the connecting duct 5 is disposed to overlap a portion of the vehicle harness 7 in a vertical direction of the vehicle.

Specifically, the connecting duct 5 is bent in a hairpin shape (substantially U shape) protruding to the rearward of the vehicle. A connecting portion of the connecting duct 5 connected to the floor-side duct 3 (hereafter referred to as "floor-side connected portion 5a") and a connecting portion of the connecting duct 5 connected to the seat-side duct 4 (hereafter referred to as "seat-side connected portion 5b") are disposed at substantially the same positions in the front-rear direction of the vehicle. A curved portion 5c of the connecting duct 5 is disposed closer to a rear side of the vehicle than the floor-side connected portion 5a and the seat-side connected portion 5b.

The vehicle harness 7 is curved in a hairpin shape (substantially U-shape) protruding to the rearward of the vehicle similarly to the connecting duct 5. A connecting portion of the vehicle harness 7 connected to the floor-side wiring member (hereafter referred to as "floor-side connector 7a") and a connecting portion of the vehicle harness 7 connected to the seat-side wiring member (hereafter referred to as "seat-side connector 7b") are disposed at substantially the same positions in the front-rear direction of the vehicle. A curved portion 7c of the vehicle harness 7 is disposed closer to the rear side of the vehicle than the floor-side connector 7a and the seat-side connector 7b are.

The floor-side connected portion 5a of the connecting duct 5 and the floor-side connector 7a of the vehicle harness 7 are disposed close to each other. In the present embodiment, the floor-side connected portion 5a and the floor-side connector 7a are disposed to be adjacent to each other in a vehicle width direction (vehicle left-right direction).

The seat-side connected portion 5b of the connecting duct 5 and the seat-side connector 7b of the vehicle harness 7 are disposed close to each other. In the present embodiment, the seat-side connected portion 5b is disposed closer to a front side of the vehicle and a left side of the vehicle than the seat-side connector 7b is, and the seat-side connected portion 5b is adjacent to the seat-side connector 7b.

The floor-side connected portion 5a is disposed on one side of the floor-side connector 7a in the vehicle width direction (closer to the left side of the vehicle in an example in FIG. 2). Similarly, the seat-side connected portion 5b is disposed on one side of the seat-side connector 7b in the vehicle width direction. Therefore, the floor-side connected portion 5a, the floor-side connector 7a, the seat-side connected portion 5b, and the seat-side connector 7b are disposed in this order from the one side in the vehicle width direction. The floor-side connected portion 5a, the seat-side connected portion 5b, the floor-side connector 7a, and the seat-side connector 7b are located offset from each other in the vehicle width direction.

States of the connecting duct 5 and the vehicle harness 7 when the position of the seat 1 in the front-rear direction is adjusted in the vehicle seat air conditioning device of the present embodiment will be described with reference to FIGS. 3 and 4. In FIG. 4, the carpet 6 is not shown.

As shown by broken lines in FIGS. 3 and 4, when the seat 1 is slid toward the rear side of the vehicle, the curved portion 5c of the connecting duct 5 formed in the flexible bellows shape extends so that a bend of the curved portion 5c becomes gentle (so that a radius of curvature increases). Similarly, when the seat 1 is slid toward the rear side of the vehicle, the curved portion 7c of the vehicle harness 7 extends so that a bend of the curved portion 7c becomes gentle (so that a radius of curvature increases).

By forming the connecting duct 5 and the vehicle harness 7 in this manner, even when the position of the seat 1 in the front-rear direction is adjusted, the connecting duct 5 and the vehicle harness 7 can follow the movement of the seat 1. In the present embodiment, a position of the seat 1 in the vertical direction can be adjusted as well by a vertical adjuster mechanism (not shown).

The blower 11 is controlled by a controller (not shown) forming control means. The controller is formed by a known microcomputer including a CPU, a ROM, RAM, an I/O, and the like and performs processing such as various operations according to programs stored in the ROM and the like.

Operation signals from blower actuating switches (not shown) provided to an air conditioning operation panel (not shown) are input to the controller. By use of the blower actuating switches, it is possible to set ON/OFF of the blower 11 and blown air volumes (blower levels) of the blower 11. As the blown air volumes (blower levels) of the blower 11, a lower air volume (Lo), a middle air volume (Mid), and a high air volume (Hi) are set preferably, for example. The air conditioning operation panel is also provided with various operation switches for the air conditioner 20 for the vehicle.

As described above, in the present embodiment, the connecting duct 5 is formed so as to be deformed to follow the displacement of the seat 1. In this way, even when the position of the seat 1 is adjusted, the connecting duct 5 can be deformed to follow the connecting duct 5. At this time, in the present embodiment, the floor-side duct 3 and the seat-side duct 4 communicate with each other through the connecting duct 5. In other words, the floor-side duct 3 and the seat-side duct 4 are respectively connected to the connecting duct 5. Therefore, it is possible to prevent a leakage of the conditioned air from between the ducts 4, 5, 6 and inflow of outside air from between the ducts 4, 5, 6 into the ducts 4, 5, 6. As a result, it is possible to secure air conditioning performance.

Since the connecting duct 5 is provided along the vehicle harness 7 in the present embodiment, movements of the connecting duct 5 and the vehicle harness 7 when the position of the seat 1 is adjusted are similar to each other. In this way, it is possible to suppress interference between the connecting duct 5 and the vehicle harness 7 and entanglement of the connecting duct 5 and the vehicle harness 7 with each other. As a result, it is possible to improve ease of mounting.

To mount the seat 1 to the vehicle main body, work for connecting the member (e.g., the vehicle harness 7) between the floor 2 and the seat 1 is required in the conventional art. In the present embodiment, the floor-side connected portion 5a of the connecting duct 5 and the floor-side connector 7a of the vehicle harness 7 are disposed close to each other and the seat-side connected portion 5b of the connecting duct 5 and the seat-side connector 7b of the vehicle harness 7 are disposed close to each other. Therefore, it is possible to connect the connecting duct 5 between the floor 2 and the seat 1 simultaneously with the conventionally existing work for connecting the vehicle harness 7 between the floor 2 and the seat 1. Therefore, it is possible to easily mount the connecting duct 5 to the floor 2 and the seat 1 without increasing mounting man-hours.

Second Embodiment

Figure 5:
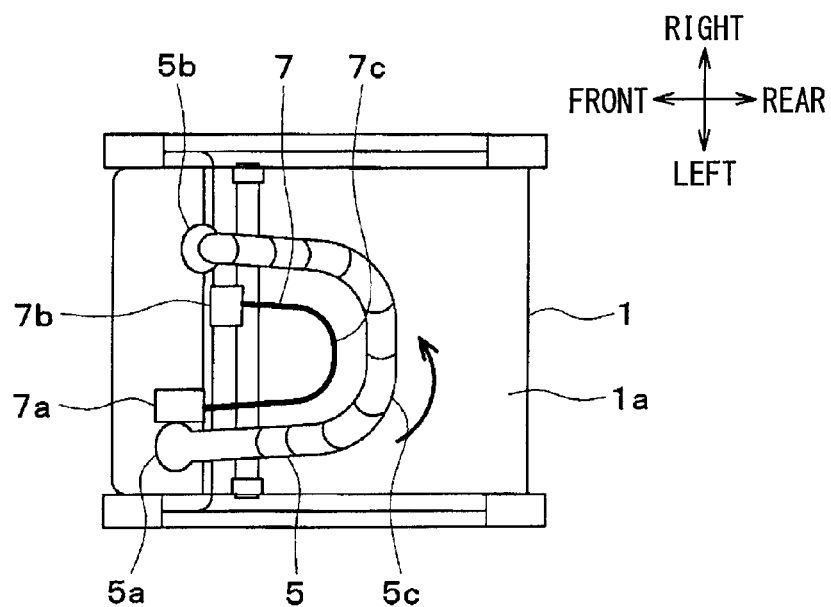
FIG. 5 is a schematic plan view of a seat face of a seat according to a second embodiment seen from below a vehicle.
Figure 6:
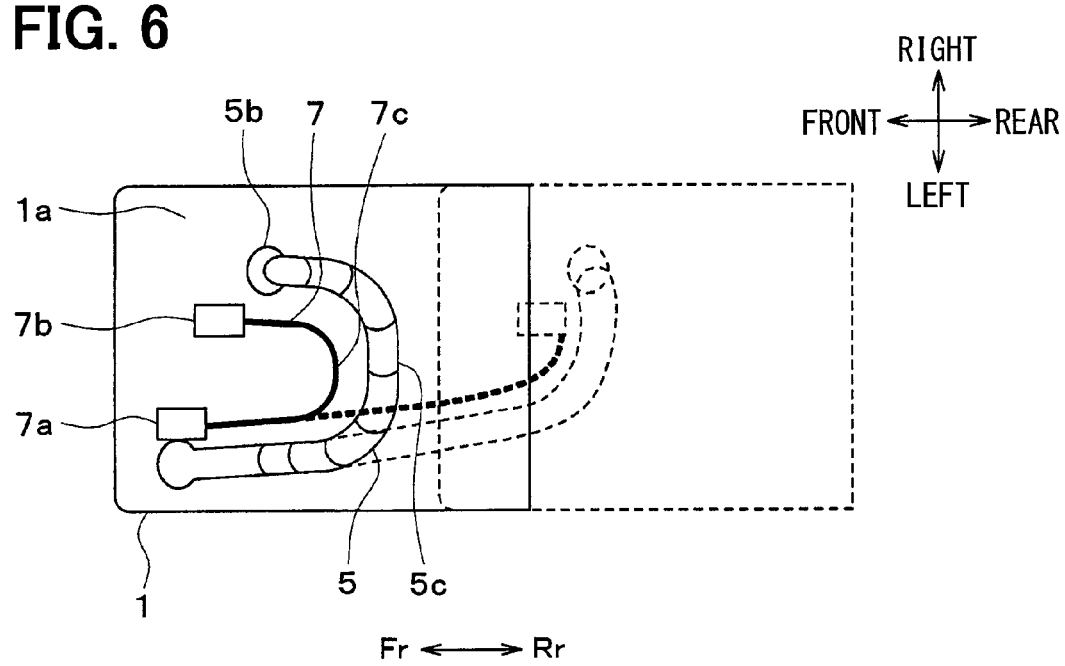
FIG. 6 is a view for explaining a state of the seat air conditioning device according to the second embodiment when a position of the seat in a front-rear direction is adjusted.

The second embodiment will be described based on FIGS. 5 and 6. The present second embodiment is different in structures of a connecting duct 5 and a vehicle harness 7 from the above-described first embodiment. FIGS. 5 and 6 show a seat face 1a of a seat 1 seen from below a vehicle.

As shown in FIGS. 5 and 6, the connecting duct 5 is disposed at such a position as not to overlap the vehicle harness 7 in a vertical direction of the vehicle. The connecting duct 5 and the vehicle harness 7 are disposed in the same plane. Specifically, a substantially U-shaped inner peripheral face of the connecting duct 5 (the face close to a front side of the vehicle) is disposed to face a substantially U-shaped outer peripheral of the vehicle harness 7 (the face close to a rear side of the vehicle).

According to the present embodiment, as shown in FIG. 6, when a front-rear position of the seat 1 is adjusted, the connecting duct 5 and the vehicle harness 7 can be moved while kept parallel to each other. Therefore, it is possible to obtain enhanced effect in suppressing interference between the connecting duct 5 and the vehicle harness 7 and enhanced effect in suppressing entanglement of the connecting duct 5 and the vehicle harness 7 with each other. As a result, it is possible to further improve ease of mounting.

Since the connecting duct 5 and the vehicle harness 7 are disposed in the same plane in the present embodiment, it is possible to save space in the vertical direction of the vehicle. In recent years, a space around a vehicle seat, e.g., a space below the vehicle seat tends to be small to secure a larger space in a vehicle compartment. It is effective especially in such a vehicle to dispose the connecting duct 5 and the vehicle harness 7 in the same plane as in the present embodiment.

Third Embodiment

Figure 7:
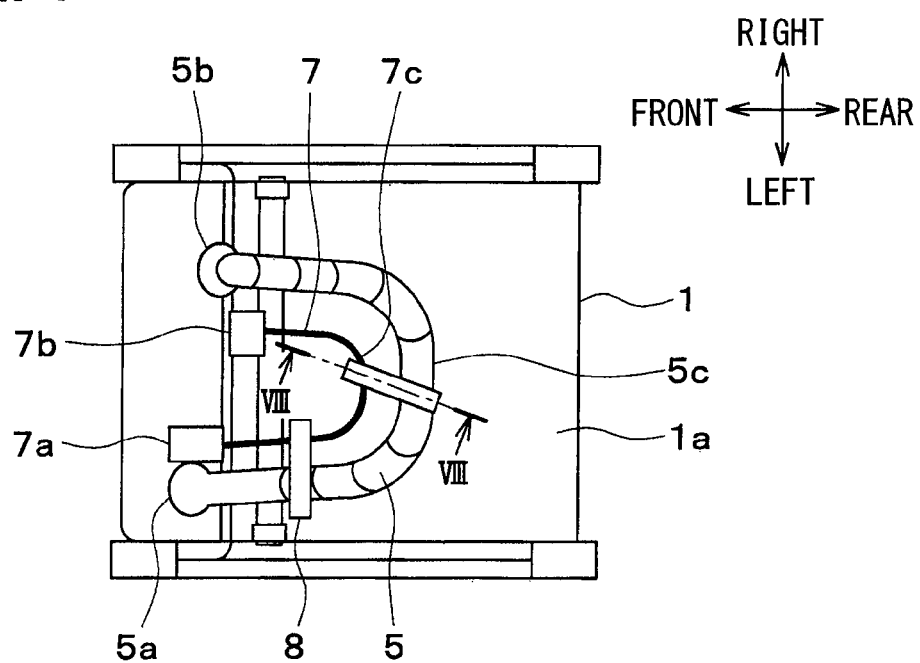
FIG. 7 is a schematic plan view of a seat face of a seat according to a third embodiment seen from below a vehicle.
Figure 8:
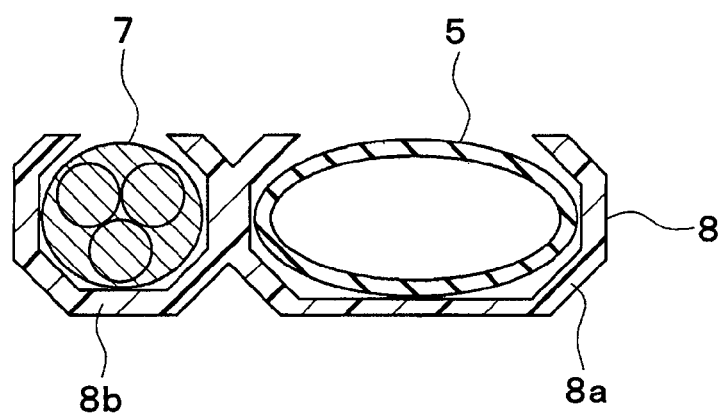
FIG. 8 is a sectional view taken along line VIII-VIII in FIG. 7.

The third embodiment will be described with reference to FIGS. 7 and 8. As shown in FIGS. 7 and 8, a connecting duct 5 and a vehicle harness 7 are bound by a binding member 8. The binding member 8 of the present embodiment is formed by a clip member integrally formed by a retaining portion 8a that retains the connecting duct 5, and a retaining portion 8b that retains the vehicle harness 7.

According to the present embodiment, when a front-rear position of a seat 1 is adjusted, the connecting duct 5 and the vehicle harness 7 can be moved smoothly while bound together. Therefore, it is possible to obtain enhanced effect in suppressing interference between the connecting duct 5 and the vehicle harness 7 and enhanced effect in suppressing entanglement of the connecting duct 5 to the vehicle harness 7. As a result, it is possible to further improve ease of mounting. Moreover, unintended deformation of the connecting duct 5 and the vehicle harness 7 can be suppressed and the connecting duct 5 and the vehicle harness 7 can be protected.

Fourth Embodiment

The fourth embodiment will be described with reference to FIG. 9. The present fourth embodiment is different in a position where the blower 11 is disposed from the above-described first embodiment.

Figure 9:
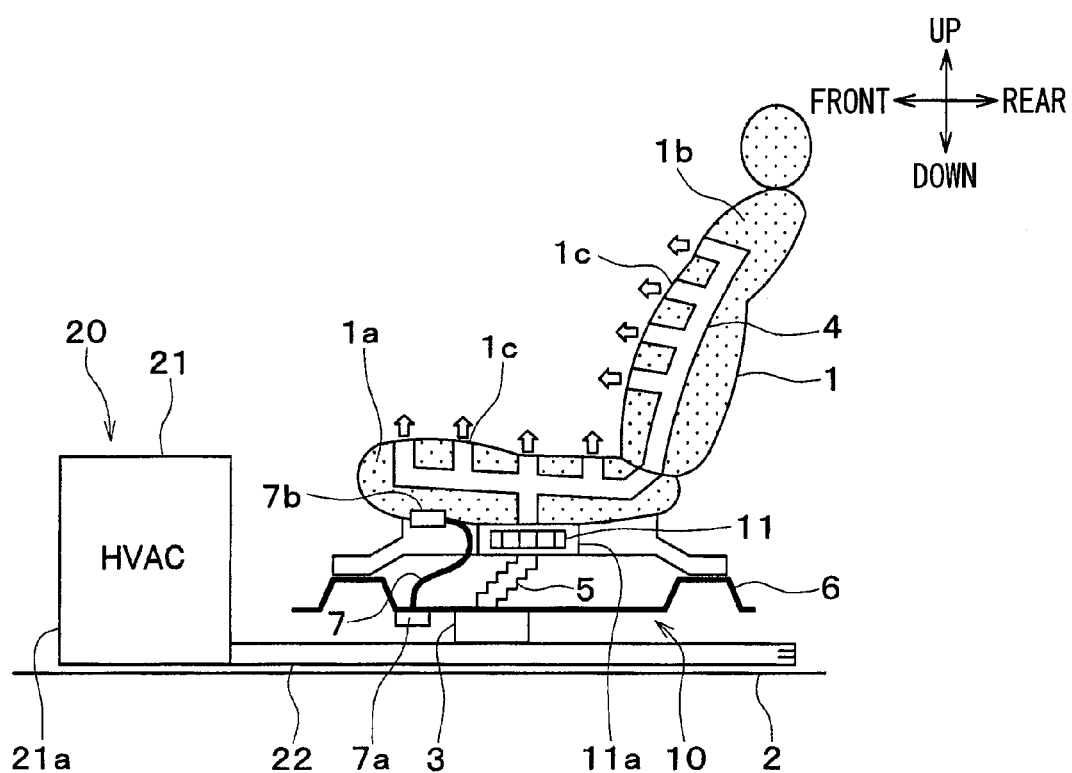
FIG. 9 is a schematic diagram showing a general structure of a seat air conditioning device according to a fourth embodiment.

As shown in FIG. 9, the blower 11 of the present embodiment is embedded in a seat face 1a of a seat 1. A connecting duct 5 is connected to a suction side of the blower 11, i.e., an air suction port of a casing 11a of the blower 11. A seat-side duct 4 is connected to a blowing side of the blower 11, i.e., an air blow outlet of the casing 11a of the blower 11. Therefore, in the present embodiment, the connecting duct 5 and the seat-side duct 4 are connected to each other with the blower 11 interposed therebetween.

Other structures are similar to those in the first embodiment. Therefore, according to the seat air conditioning device of the present embodiment, it is possible to obtain similar effects to those of the first embodiment.

Fifth Embodiment

The fifth embodiment will be described with reference to FIG. 10. The present fifth embodiment is different in a position where the blower 11 is disposed from the above-described first embodiment.

Figure 10:
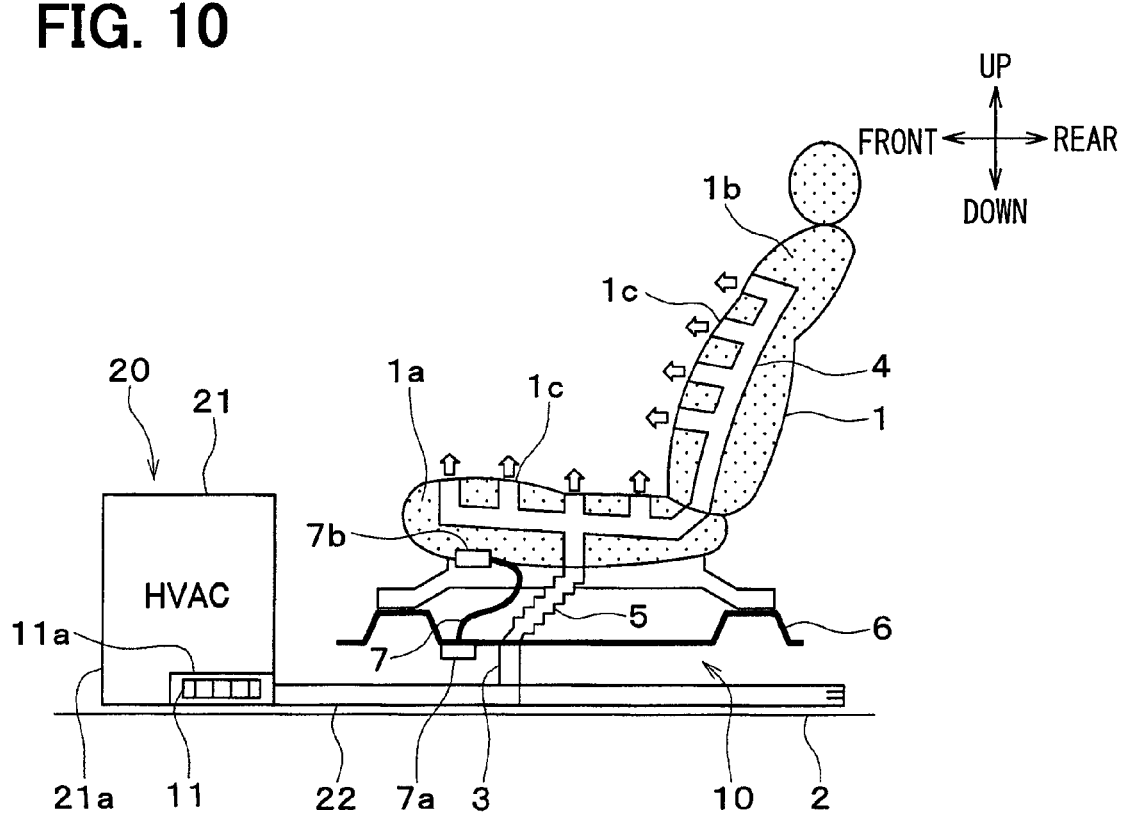
FIG. 10 is a schematic diagram showing a general structure of a seat air conditioning device according to a fifth embodiment.

As shown in FIG. 10, the blower 11 of the present embodiment is disposed near an interior air conditioning unit 21. Specifically, the blower 11 is disposed on a most downstream side of an air flow in an air conditioning case 21a of the interior air conditioning unit 21. To a suction side of the blower 11, i.e., an air suction port of the casing 11a of a blower 11, the air conditioning case 21a is connected. To a blowing side of the blower 11, i.e., an air blow outlet of the casing 11a of the blower 11, a seat air conditioning duct 22 is connected.

Other structures are similar to those of the first embodiment. Therefore, according to the vehicle seat air conditioning device of the present embodiment, it is possible to obtain similar effects to those of the first embodiment.

Sixth Embodiment

Figure 11:
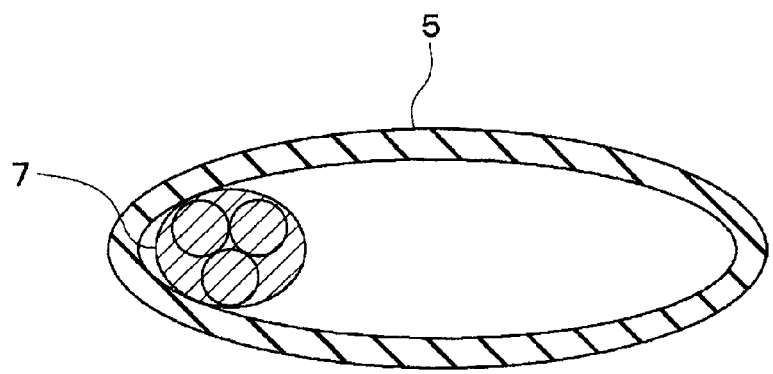
FIG. 11 is a schematic sectional view of a connecting duct and a vehicle harness according to a sixth embodiment.

The sixth embodiment will be described with reference to FIG. 11. As shown in FIG. 11, an inside diameter of a connecting duct 5 is sufficiently larger than an outside diameter of a vehicle harness 7. The vehicle harness 7 is disposed inside the connecting duct 5.

Specifically, the connecting duct 5 is formed to have an oval sectional shape. The vehicle harness 7 is formed to have a substantially circular sectional shape. The vehicle harness 7 is disposed on one end side in a long axis direction inside the connecting duct 5. A portion inside the connecting duct 5 where the vehicle harness 7 is not disposed forms an air flow path through which air flows.

According to the present embodiment, by disposing the vehicle harness 7 inside the connecting duct 5, it is possible to dispose the connecting duct 5 along the vehicle harness 7. Therefore, it is possible to obtain similar effects to those of the above-described first embodiment.

Other Embodiment

It should be appreciated that the present disclosure is not limited to the embodiments described above and can be modified appropriately within the scope of the present disclosure. The embodiments above can be combined appropriately unless a combination is obviously impossible.

Figure 12:
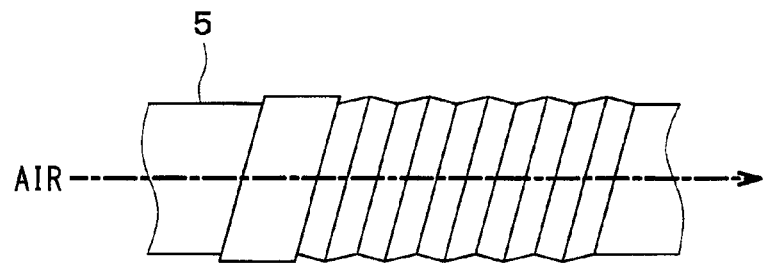
FIG. 12 is a schematic front view of a connecting duct according to another embodiment.

Although the bellows duct is used as the connecting duct 5 in each of the above-described embodiments, the connecting duct 5 is not limited to this type. An arbitrary duct may be used as the connecting duct 5, when the duct can follow movement of the seat 1 and air can flow through the duct. As the connecting duct 5, a rubber or elastomer hose may be used or a flexible duct shown in FIG. 12 may be used, for example.

Figure 13:
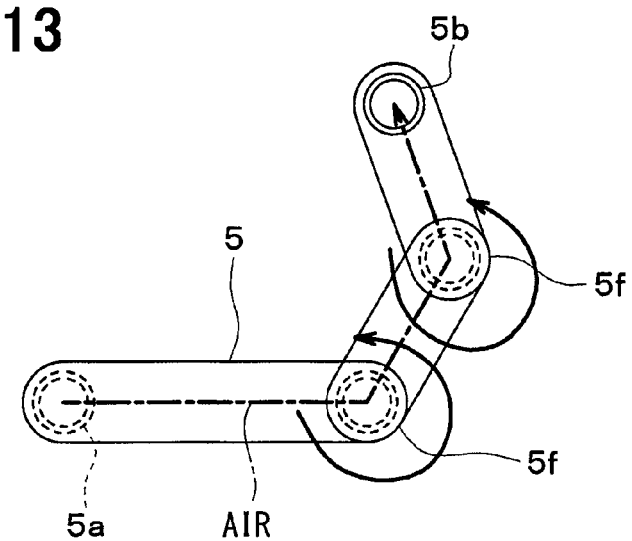
FIG. 13 is a schematic plan view of a connecting duct according to another embodiment.

As the connecting duct 5, an articulated duct shown in FIG. 13 may be used. The articulated duct is a duct having articulation portions 5f and formed to be rotatable about the articulation portions 5f.

Figure 14:
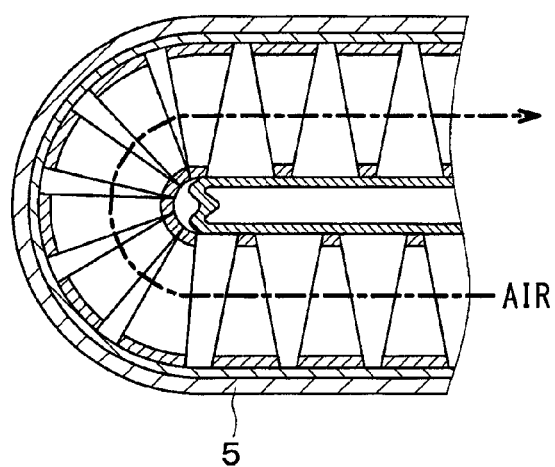
FIG. 14 is a schematic sectional view of a connecting duct according to another embodiment.

As the connecting duct 5, a flat U-shaped duct (caterpillar-shaped duct) shown in FIG. 14 may be used. The flat U-shaped duct is a flat duct which can be easily bent because of difference in rigidity between an inner member and an outer member.

Although the vehicle harness 7 for supplying electric power from the vehicle main body to the seat 1 is employed as the connecting wiring member in each of the above-described embodiments, the connecting wiring member is not limited to the vehicle harness 7 and wiring members for other uses may be employed.

Although the one connecting duct 5 is provided in each of the above-described embodiments, the number of the connecting ducts 5 is not limited to one and a plurality of connecting ducts 5 may be provided.

Although the clip member is used as the binding member 8 in the third embodiment, the binding member 8 is not limited to the clip member and a rubber band or the like may be used, for example.

When the seat air conditioning device according to the present disclosure is applied to a rear seat, cold air may be supplied from an air conditioner for a rear seat (rear air conditioner).

What is claimed is:

1. A seat air conditioning device that blows air, out of a seat, supplied from an interior air conditioning unit that air-conditions a space in a passenger compartment for a vehicle, the seat air conditioning device comprising:
    a floor-side duct disposed adjacent to a floor of a vehicle body member forming the space in the passenger compartment and connected to the interior air conditioning unit, the air supplied from the interior air conditioning unit flowing through the floor-side duct; and
    a seat-side duct disposed adjacent to the seat to communicate with the floor-side duct through a connecting duct, wherein:
    the connecting duct is configured to be deformed to follow displacement of the seat;
    the connecting duct is arranged along a connecting wiring member that connects a floor-side wiring member disposed adjacent to the floor and a seat-side wiring member disposed adjacent to the seat; and
    when seen in a vertical direction of the vehicle, the connecting duct and the connecting wiring member are disposed so as to not overlap with each other, and a surface of the connecting duct closest to a front side of the vehicle and a surface of the connecting wiring member closest to a rear side of the vehicle face each other wherein the connecting wiring member and the connecting duct are both U-shaped in a horizontal plane of the vehicle, such that the connecting wiring member is within and offset of the connecting duct in a parallel manner toward a front of the vehicle.

2. The seat air conditioning device according to claim 1, wherein:
    a connecting portion of the connecting duct that is connected to the floor-side duct and a connecting portion of the connecting wiring member that is connected to the floor-side wiring member are disposed close to each other; and
    a connecting portion of the connecting duct that is connected to the seat-side duct and a connecting portion of the connecting wiring member that is connected to the seat-side wiring member are disposed close to each other.

3. The seat air conditioning device according to claim 1, wherein the connecting duct and the connecting wiring member are disposed in a same plane.

4. The seat air conditioning device according to claim 1, wherein the connecting wiring member is disposed inside the connecting duct.

5. The seat air conditioning device according to claim 1, wherein the connecting duct and the connecting wiring member are bound by a binding member.

6. The seat air conditioning device according to claim 1, wherein a blower that blows the air from the interior air conditioning unit is provided near the floor.

7. The seat air conditioning device according to claim 1, wherein a blower that blows the air from the interior air conditioning unit is provided near the interior air conditioning unit.

8. The seat air conditioning device according to claim 1, wherein the connecting duct and the connecting wiring member are configured to be able to be moved while being kept parallel to each other when a position of the seat is adjusted in a front-rear direction of the vehicle.

9. The seat air conditioning device according to claim 1, wherein the U-shape, of the connecting wiring member is smaller than the U-shape of the connecting duct, and the U-shape of the connecting wiring member is positioned on an inner side of the U-shape of the connecting duct.

10. The seat air conditioning device according to claim 1, wherein the connecting duct and the connecting wiring member are geometrically similar to each other.

11. The seat air conditioning device according to claim 1, wherein the surface of the connecting duct closest to the front of the vehicle and the surface of the connecting wiring member closest to the rear of the vehicle are equidistant from each other along an entire periphery thereof.

12. The seat air conditioning device according to claim 11, wherein the connecting duct and the connecting wiring member are configured to remain equidistant from each other when a position of the seat is adjusted in a front-rear direction of the vehicle.

13. The seat air conditioning device according to claim 5, wherein the binding member includes a first retaining portion configured to retain the connecting duct and a second retaining portion configured to retain the connecting wiring member.

14. The seat air conditioning device according to claim 2, wherein:
    the connecting portion of the connecting wiring member that is connected to the floor-side wiring member is disposed directly adjacent to an inner side of the connecting portion of the connecting duct that is connected to the floor-side duct; and
    the connecting portion of the connecting wiring member that is connected to the seat-side wiring member is disposed directly adjacent to an inner side of the connecting portion of the connecting duct that is connected to the seat-side duct.

\* \* \* \* \*